United States Patent [19]
Kim

[11] Patent Number: 6,122,240
[45] Date of Patent: Sep. 19, 2000

[54] LOADING TRAY FOR TRAY-LOADING TYPE OPTICAL DISC REPRODUCING DEVICE

[75] Inventor: Tae Hyoung Kim, Suwon, Rep. of Korea

[73] Assignee: LG Electronics Inc., Seoul, Rep. of Korea

[21] Appl. No.: 09/365,710

[22] Filed: Aug. 3, 1999

[30]     Foreign Application Priority Data

Aug. 3, 1998 [KR]   Rep. of Korea ...................... 98/31546

[51] Int. Cl.[7] .................................................. G11B 17/04
[52] U.S. Cl. .......................................................... 369/77.1
[58] Field of Search ................................ 369/75.1, 75.2, 369/77.1

[56]            References Cited

U.S. PATENT DOCUMENTS

| 5,140,579 | 8/1992 | Suzuki et al. . | |
| 5,793,729 | 8/1998 | Soga et al. | 369/77.1 |
| 5,930,218 | 7/1999 | Mitsui et al. | 369/77.1 |

FOREIGN PATENT DOCUMENTS

| 7-326113 | 12/1995 | Japan . |
| 8 17118 | 1/1996 | Japan . |
| 8 7430 | 1/1996 | Japan . |
| 8124264 | 5/1996 | Japan . |
| 11-39762 | 2/1999 | Japan . |
| 11-39842 | 2/1999 | Japan . |

*Primary Examiner*—William Klimowicz

[57]            ABSTRACT

The present invention relates to a loading tray for an optical disc reproducing device which can prevent an optical disc from being separated from an optical disc receiving side of the tray not only when the reproducing device is horizontally used but also when it is vertically used, which can induce the optical disc to be correctly centered by forming an optical disc centering inducing device on the tray, even when a user eccentrically positions the optical disc, and which can prevent a surface of the optical disc from being damaged due to a contact with the tray. The tray for the optical reproducing device includes a non-recording side supporting surface formed in a stepped shape in an outer margin of the tray base, a centering guide surface formed in an outer margin of the non-recording side supporting surface, a sloped guide surface slopingly formed in an outer margin of the centering guide surface, and separation preventing tabs formed at an upper portion of the outer margin of the non-recording side supporting surface.

11 Claims, 11 Drawing Sheets

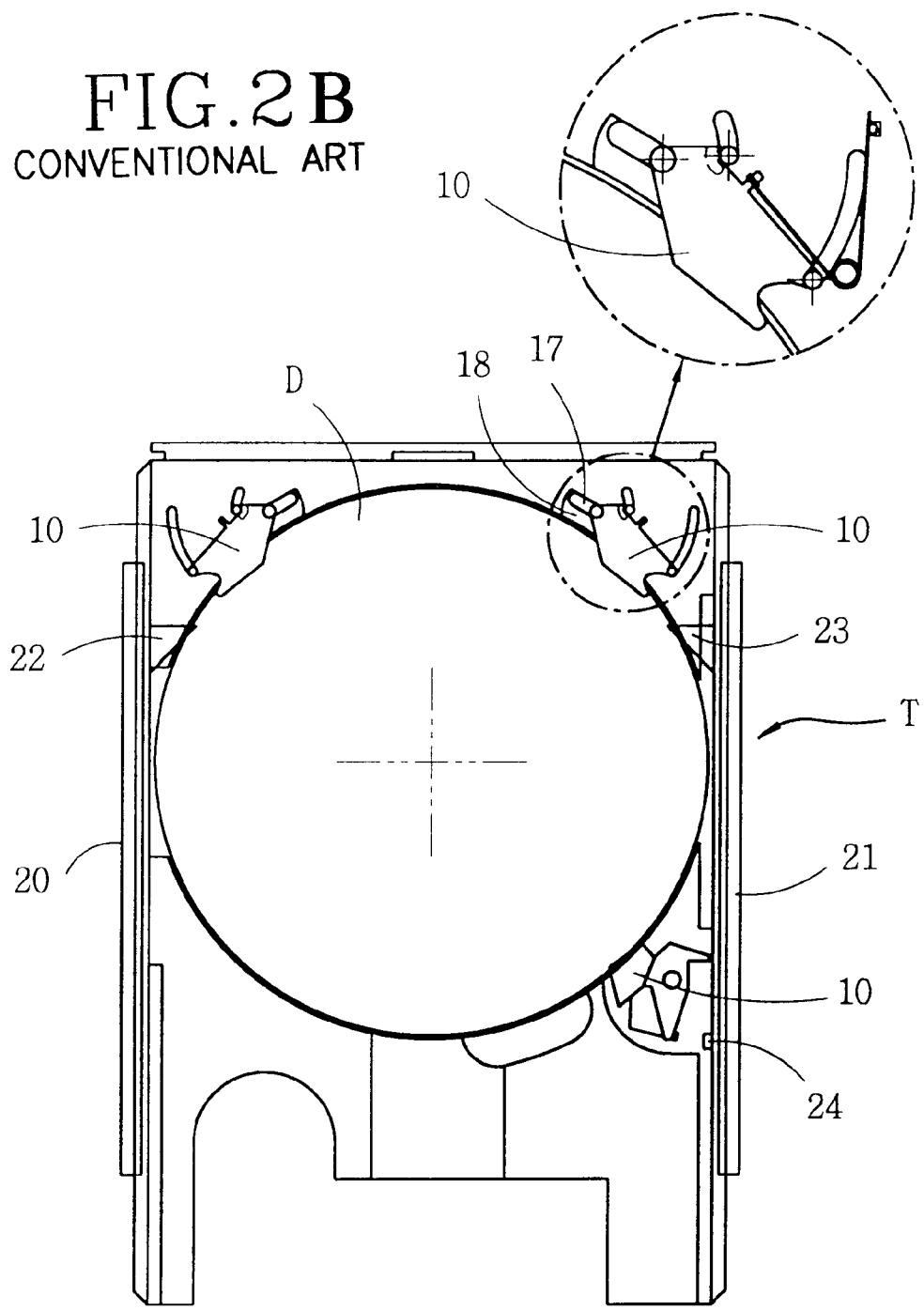

LOADING TRAY FOR TRAY-LOADING TYPE OPTICAL DISC REPRODUCING DEVICE

BACKGROUND OF THE INVENTION

1. Field of the Invention

The present invention relates to a loading tray for a tray-loading type optical disc reproducing device, and in particular to a tray for a tray-loading type optical disc reproducing device which can prevent an optical disc from being separated from an optical disc receiving side of the tray not only when the tray type optical disc recording/reproducing device is operated in a horizontal orientation, but also when it is operated in a vertical orientation.

2. Description of the Background Art

In general, in order to prevent an optical disc from being separated from a loading tray T when a tray-loading type optical disc reproducing device is operated in a vertical operation, as shown in FIG. 1, a plurality of optical disc holder hook units 1 are provided at the outer edges of an optical disc receiving well 4 of the tray T composing the optical disc reproducing device, such as a CD-ROM drive, a DVD ROM drive or a CD audio player characterized by including a loading mechanism for loading and positioning an optical disc recording medium for reproducing by inserting the optical disc recording medium into a main body thereof, and rotating it by a turntable.

Each optical disc holder hook unit 1 is mounted on a hook stopper 2 which is fixed to an upper portion of the tray so that the holder hook unit 1 can be freely moved both radially inwardly and outwardly relative a central disc-receiving portion of the tray T, namely in the a and b directions shown in FIG. 1.

Accordingly, in case the tray T is vertically oriented(I,e., an edge), if the optical disc holding hook units I are moved toward a non-recording side of an optical disc in a state where the optical disc is received in the optical disc receiving well 4 of the tray T, the optical disc is prevented from being separated from the tray T.

However, the optical disc holding hook units 1 as shown in FIG. 1 are forcibly inserted into the tray T, and thus may be tightly or slackly moved in an inward or outward direction, which reduces reliability of the operation.

In addition, a user must manually moves the optical disc holding hook units in order to use the optical disc in a vertical orientation.

Also, in the case that the optical disc holding hook units are affected by the environmental conditions (especially high temperature), the optical disc hook units may contact the optical disc during reproducing of the optical disc, thereby damaging a surface of the optical disc.

Moreover, a number of components are required, which results in increased fabrication costs. An assembly process thereof is also quite complicated.

Accordingly, in order to overcome the above-described disadvantages, a loading tray as shown in FIG. 2 has been suggested.

Optical disc holders 10 exactly fixing the optical disc D to the receiving side of the tray T by clamping the non-recording side of the optical disc D are disposed on the outer edges of the optical disc receiving well of the tray T.

The optical disc holders 10 are provided to be freely movable between a first position (17, indicated in solid lines) for fixing the optical disc D to the tray T and a second position (18, indicated in broken lines) for releasing the optical disc D.

When the tray T is inserted into the disc reproducing device, holder releasing operation protrusions 22, 23, 24 connected to respective slider rails 20, 21 of the disc reproducing device are contacted with the holders 10, and thus clamp the optical disc to the tray T.

However, in the conventional loading tray for the optical disc reproducing device as shown in FIG. 2, the structure of the optical disc holders is complicated, thereby reducing assembly productivity. In addition, when the optical disc reproducing device is vertically oriented, and the optical disc is inserted thereinto, the optical disc may be separated from the tray.

Also, since a special optical disc holder structure is employed, the optical disc may contact with the tray during rotation, and thus a surface thereof may be damaged.

Therefore, in order to overcome such disadvantages, as illustrated in FIG. 3, a tray shaped to operate as an optical disc holder has been developed, instead of separately providing a movable optical disc holder.

Referring to FIG. 3, the tray T is formed with an optical disc receiving well 30 having a slightly greater diameter than the optical disc.

At predetermined portions of the upper surfaces of optical disc guide walls 31 which correspond to sidewalls of the optical disc receiving well 30 are formed fixing protrusions 32a, 32b and moving protrusions 33a, 33b.

In order to position the optical disc on the optical disc receiving surface 30, the moving protrusions 33a, 33b are pushed in the direction A shown in FIG. 3 to permit the outer edge of the optical disc to be inserted between the fixing protrusions 32a, 32b and the optical disc receiving well 30.

Here, the moving protrusions 33a, 33b are moved outwardly, and thus deformed. As a result, the optical disc may be inserted into the optical disc receiving well 30.

At least one fixing protrusion and at least one moving protrusion are formed at the lateral edges of the optical disc receiving well 30. Even if the tray T is vertically positioned, the optical disc is not separated from the optical disc receiving well 30.

However, in the structure as shown in FIG. 3, the surface of the optical disc may be easily damaged when the optical disc is extracted or inserted.

Accordingly, in order to overcome the above-mentioned disadvantage, a tray for an optical disc reproducing device as shown in FIG. 4 has been suggested. A 12 cm optical disc receiving well 40 and an 8 cm optical disc receiving well 50 are formed in the tray T, respectively. A bottom surface 41 corresponding to the optical disc D is formed in the 12 cm optical disc receiving well 40. The optical disc D when vertically oriented is captively supported within a space defined by lateral wells 42, 43 and protrusions 44, 44', 44".

The operation of the optical disc reproducing device employing a loading tray as shown in FIG. 4 will now be described with reference to FIGS. 5a to 6.

First, when the optical disc reproducing device is installed into a computer in a horizontal orientation, as depicted in FIG. 5a, the 12 cm optical disc D is horizontally positioned on the bottom surface 41 of the 12 cm optical disc receiving well 40 of the tray T.

Here, the 12 cm optical disc D is positioned on the bottom surface 41, not contacted with the protrusions 44, 44', 44".

In the case that the 12 cm optical disc D is transferred into a main body B of the optical disc reproducing device together with the tray T, it is clamped by a damper (not shown) on a turntable 3, rotated by a motor M and reproduced by an optical head P.

On the other hand, when the 8 cm optical disc D' is employed, referring to FIG. 5b, the 8 cm optical disc D' is horizontally positioned on the bottom surface 51 of the 8 cm optical disc receiving well 50 of the tray T.

When the 8 cm optical disc D' is transferred into the main body B of the optical disc device together with the tray T, it is clamped by the damper on the turntable 3, rotated by the motor M and reproduced by the optical head P.

However, when the optical disc reproducing device is installed into a computer in a vertical orientation, as shown in FIG. 6a, the outer edged of the one side of the 12 cm optical disc D extends downwardly due to gravity.

Referring to FIGS. 6a and 6b, the outer edged of non-recording side thereof is supported by the protrusions 44, 44', 44", thereby preventing the optical disc D from falling out in the Z direction.

Here, as illustrated in FIG. 6a, a center θ1 of a hole of the 12 cm optical disc D is positioned lower than a center θ2 of the turntable 3 by δ.

In this state, if the user pushes a loading button, a tray moving unit (not shown) is operated, and thus the tray T is moved in the Y1 direction as shown in FIG. 6a.

The 12 cm optical disc D is roughly vertically maintained, and transferred into the main body B of the optical disc reproducing, together with the tray T.

Here, when the optical disc is moved from a position just before a final receiving position to the final receiving position, as illustrated in FIG. 6c, a downwardly protruding portion thereof, namely a lower edge portion d is guided by a guide unit 60.

That is, the optical disc D is guided and ascended by the guide unit 60, and thus moved simultaneously toward the center of the tray T and toward the bottom surface 41. Here, a centering operation of an initial stage is performed.

The double-dashed broken line in FIG. 6c denotes this state.

However, the optical disc D is not properly positioned in order to face the clamper of the main body B of the optical disc reproducing device.

Thereafter, a turntable loading unit (not shown) is operated, and thus the turntable 3 is moved and the optical disc D is clamped by the damper of the turntable 3.

In more detail, during the clamping operation, the optical disc is centered by a tapered centering unit C at the position indicated by the solid line in FIG. 6c, namely a position slightly separated from the guide unit 60.

That is, the center φ1 of the optical disc is moved along a trace indicated by reference numerals 61, 62, 63, reaches a final position θ, and is centered.

In this state, the optical disc D is rotated by the motor M, and reproduced by the optical head 3.

However, the tray as shown in FIG. 4 does not include a centering device for the optical disc. Accordingly, when the user eccentrically positions the optical disc, and the optical disc is centered, the disc may be rubbed against the tray. That is to say, when the user eccentrically positions the optical disc, and the optical disc is then centered, the surface thereof may be damaged due to contact with the tray during rotation.

In addition, while the tray is being loaded or unloaded, the optical disc may become separated therefrom.

SUMMARY OF THE INVENTION

Accordingly, it is a primary object of the present invention to provide a loading tray for a tray-loading optical disc reproducing device which can prevent an optical disc from being separated from the tray even when the disc reproducing device is vertically oriented.

It is another object of the present invention to provide a loading tray for a tray-loading optical disc reproducing device which can induce an optical disc to be correctly centered by forming an optical disc centering inducing device on the tray, even when an user eccentrically positions the optical disc.

It is still another object of the present invention to provide a loading tray for a tray-loading optical disc reproducing device which can prevent a recording side of an optical disc from being damaged due to contact with the tray during a loading/unloading operation.

In order to achieve the above-described objects of the present invention, there is provided a loading tray for a tray-loading optical disc reproducing device including: a tray base; a non-recording side supporting surface formed in a stepped shape on an outer margin of the tray base; a centering guide unit upwardly vertically formed on an outer surface of the non-recording side supporting unit; a slope guide unit upwardly slopingly formed on an outer surface of the centering guide unit; and a separation preventing unit formed at an upper portion of the outer surface of the non-recording side supporting unit.

In order to achieve the above-described objects of the present invention, there is also provided a loading tray for a tray-loading disc optical reproducing device including: a tray base; a vertical optical disc supporting unit formed at an upper portion of an outer surface of the tray base; and a slope guide unit having a predetermined slope between the tray base and the vertical optical disc supporting unit.

In order to achieve the above-described objects of the present invention, there is also provided a loading tray for a tray-loading optical disc reproducing device including an optical disc separation preventing unit for preventing an optical disc recording medium positioned at a receiving side of the tray from being separated therefrom.

BRIEF DESCRIPTION OF THE DRAWINGS

The present invention will become better understood with reference to the accompanying drawings which are given only by way of illustration and thus are not limitative of the present invention, wherein:

FIG. 2 is a plan view illustrating another example of a conventional loading tray for transferring an optical disc;

FIG. 6b is a cross-sectional view taken along line VIb—VIb in FIG. 6a;

DETAILED DESCRIPTION OF THE INVENTION

Figure 1A:
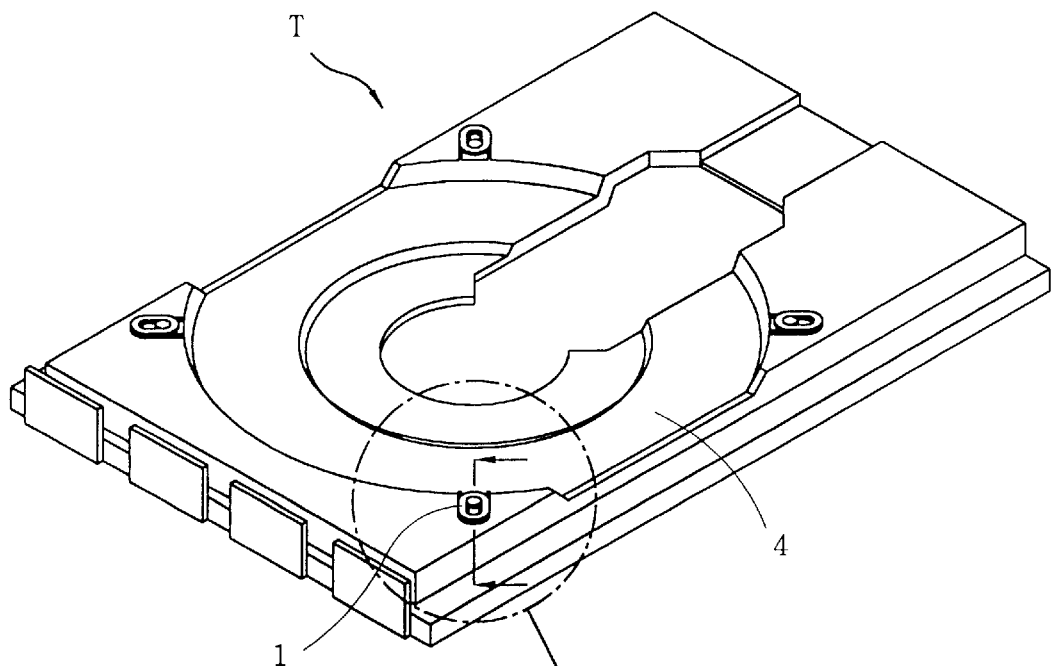
FIG. 1 is a perspective view illustrating a conventional loading tray for transferring an optical disc.
Figure 1B:
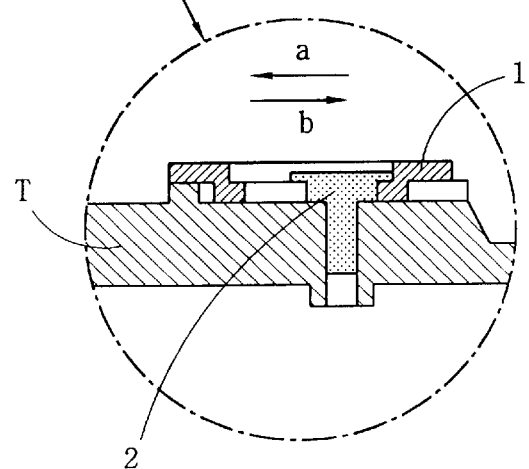
Figures 3A, 3B:
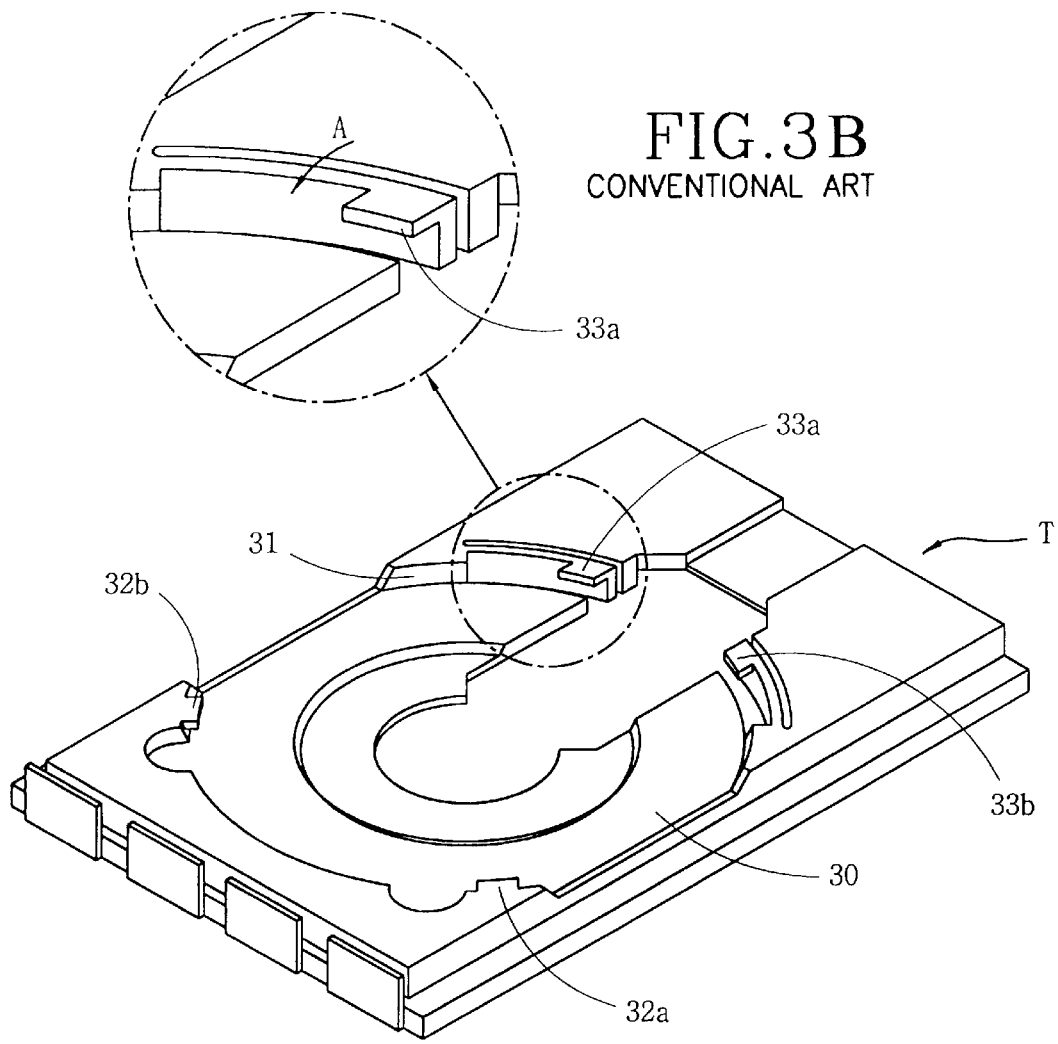
FIG. 3 is a perspective view illustrating a third example of a conventional loading tray for transferring an optical disc.
Figure 4:
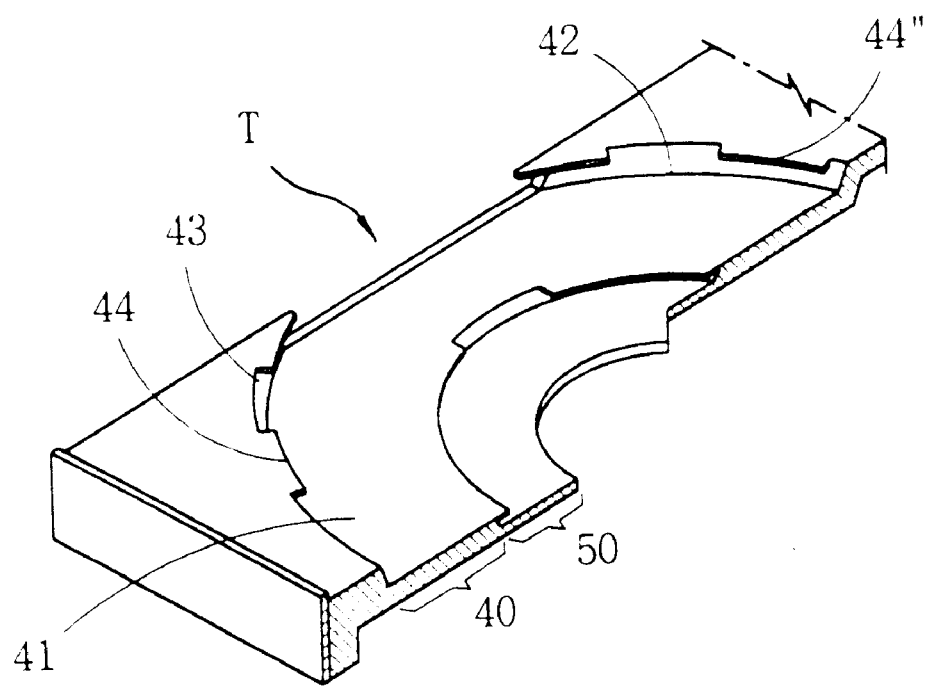
FIG. 4 is a perspective view partially illustrating a fourth example of a conventional loading tray for transferring an optical disc.
Figure 5A:
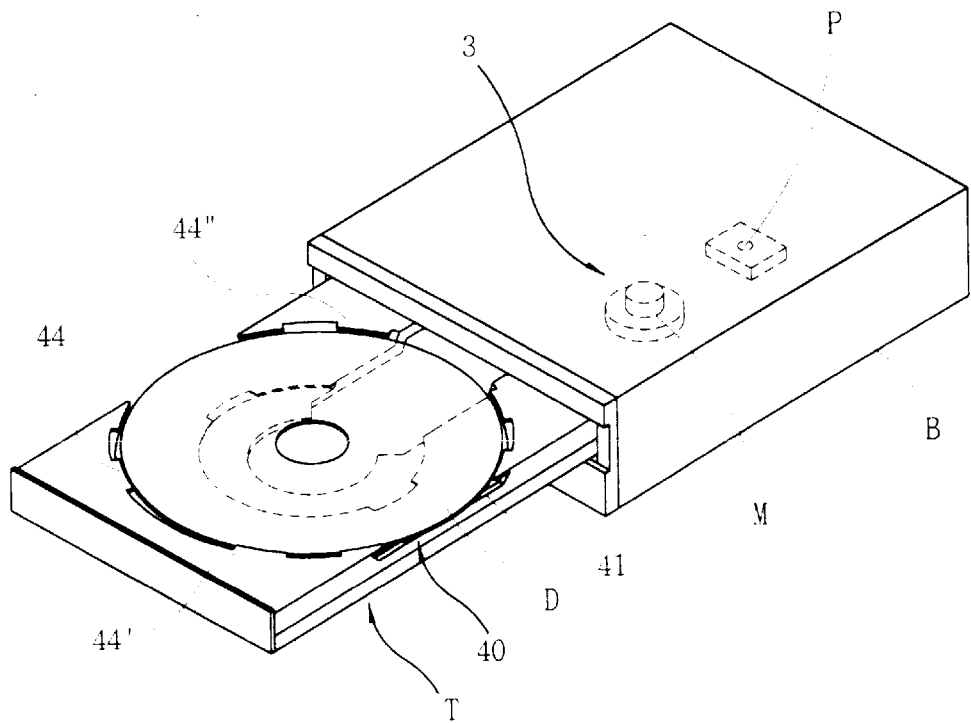
FIG. 5a is a perspective view illustrating a state where an optical disc reproducing device employing the loading tray for transferring a 12 cm optical disc according to the fourth example of the conventional art is horizontally oriented.
Figure 5B:
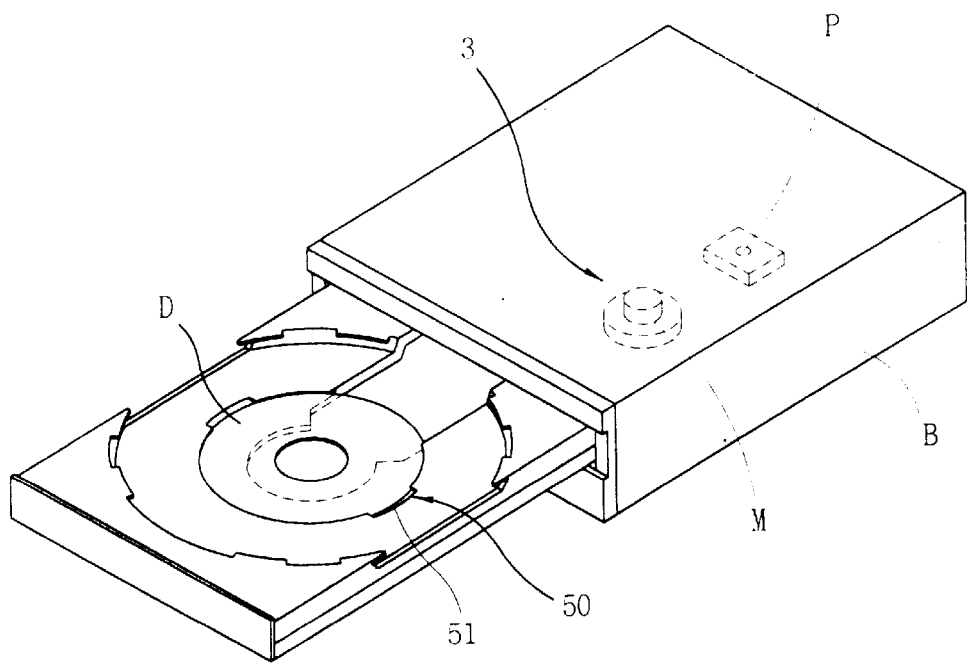
FIG. 5b is a perspective view illustrating a state where an optical disc reproducing device employing the loading tray for transferring an 8 cm optical disc according to the fourth example of the conventional art is horizontally oriented.
Figure 6A:
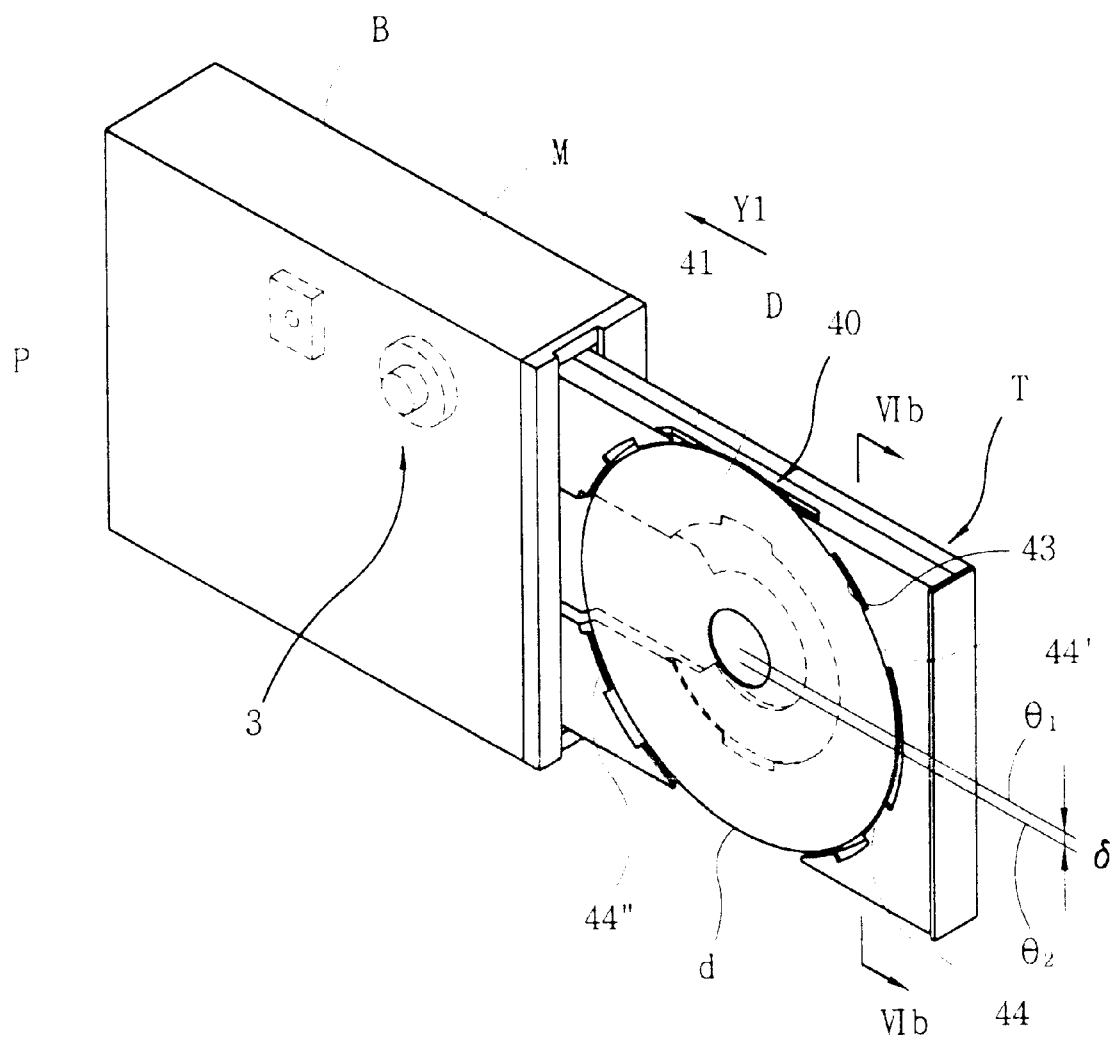
FIG. 6a is a perspective view illustrating a state where an optical disc reproducing device employing the loading tray for transferring the optical disc according to the fourth example of the conventional art is vertically oriented.
Figure 6B:
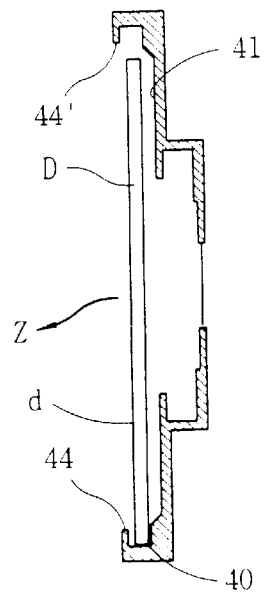
Figure 6C:
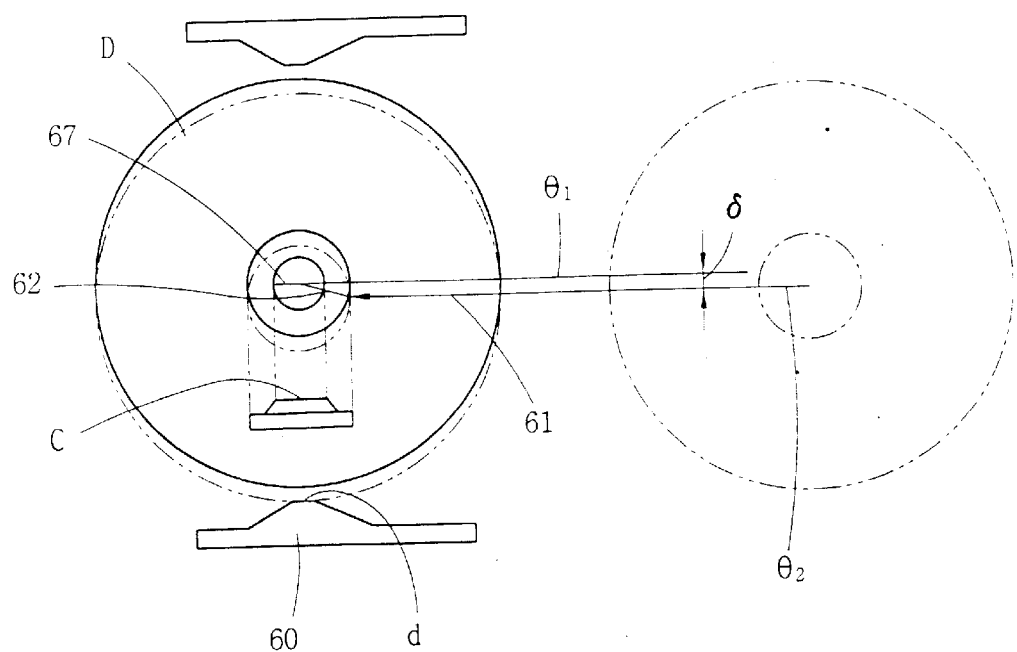
FIG. 6c is a schematic view showing the movement of the optical disc loaded on the loading tray according to the fourth example of the conventional art until it is loaded.

A loading tray for a tray-loading type optical disc reproducing device in accordance with a preferred embodiment of the present invention will now be described in detail with reference to the accompanying drawings.

Referring to FIGS. 7 to 9a, a non-recording side supporting surface 101 for supporting a non-recording side K of an optical disc D to be positioned on a tray base 100 is formed in an upward stepped shape at an outer edge of the tray base 100. A centering guide surface 110 is formed radially outwardly of the non-recording side supporting unit 101 and spaced upwardly from the tray base 100 relative to the non-recording side supporting unit 101.

A vertical guide unit and sloped guide surface 120 is formed radially outside the centering guide surface 110, upwardly and outwardly slopingly from the centering guide surface 110.

The sloped guide surface 120 is not necessary when the optical disc D is horizontally oriented, but is specially required to guide the optical disc D to a receiving side when it is vertically oriented.

A vertical optical disc supporting groove 130 is formed to have a predetermined depth radially outwardly of an upper edge of the sloped guide surface 120.

In order to prevent the optical disc D from being separated when the tray T is vertically oriented, optical disc separation preventing tabs are formed at opposite the sloped guide surface 120 centering around the vertical optical disc supporting groove 130.

Figure 10:
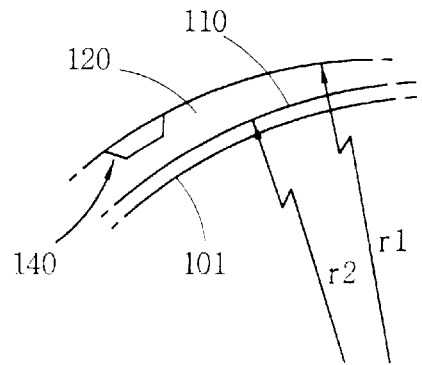
FIG. 10 is a schematic view illustrating a state where an optical disc separation preventing unit in accordance with the present invention is formed when the optical disc is eccentrically positioned centering around a spindle axis.

The structure of the optical disc separation preventing tabs 140 will now be described in more detail. As shown in FIG. 10, the optical disc separation preventing tabs 140 are positioned eccentrically of the receiving side of the optical disc D. An inner surface of the optical disc separation preventing tabs 140 includes a first sloped side 141 facing the sloped guide surface 120, and a second sloped side 142 extended acutely from an edge of the first sloped side 141, and a sloping in an opposite direction thereto.

That is, a minimum radius r1 of the separation preventing groove 140 is greater than a maximum radius r2 of the optical disc D when the optical disc D is mounted on a spindle axis (not shown) of the disc reproducing device.

Figure 7:
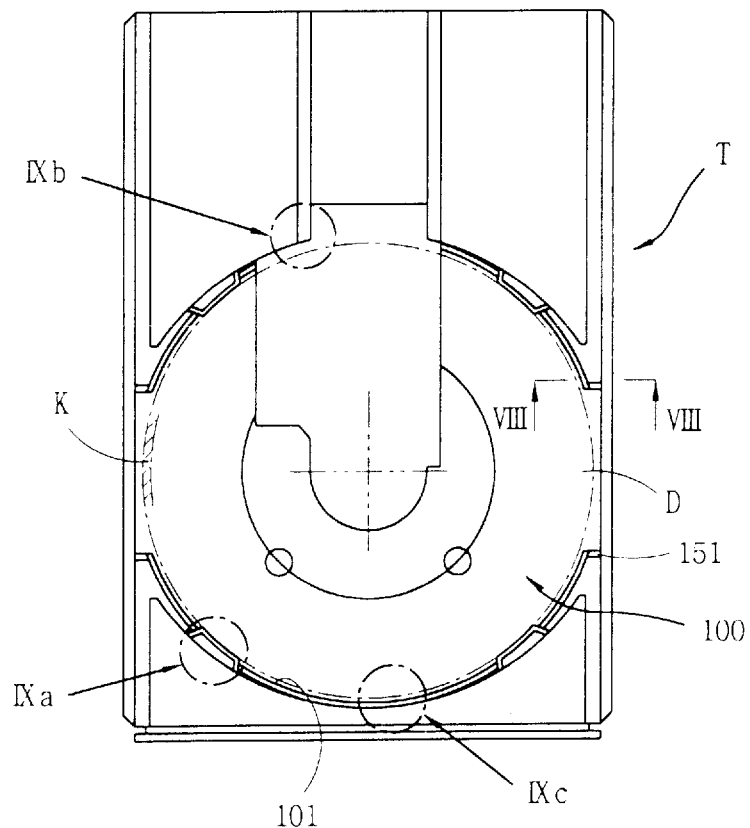
FIG. 7 is a plan view partially illustrating a tray for transferring or releasing an optical disc to/from a main body of a disc reproducing device in accordance with the present invention.
Figure 9A:
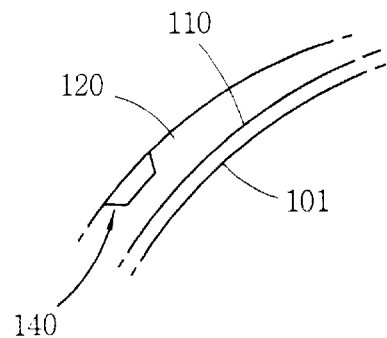
FIG. 9a is an enlarged detail view illustrating elements indicated within detail circle IXa in FIG. 7.
Figure 9B:
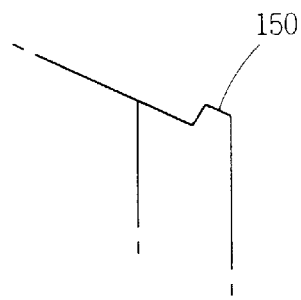
FIG. 9b is an enlarged detail view illustrating elements indicated within detail circle IXc in FIG. 7.
Figure 9C:
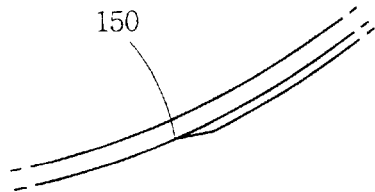
FIG. 9c is an enlarged detail view illustrating the element indicated within detailed circle IXc in FIG. 7.

On the other hand, when the optical disc D is transferred into the disc reproducing device which is vertically oriented, in order to easily insert and extract the optical disc D, as illustrated in FIGS. 7, 9b and 9c, receiving and extracting guide units 150 are formed in the tray T positioned at one side of an outer surface of a firstly-inserted portion thereof and a lastly-inserted portion of the tray base 100 where the optical disc D is inserted and transferred.

In addition, when the optical disc D is transferred into the reproducing device which is vertically oriented, in order to support the non-recording side K and to guide movement of the optical disc D, as depicted in FIG. 7, guide units 151 are formed in the tray T positioned at both sides of an outer surface of an intermediately-inserted portion of the tray base 100 where the optical disc D is inserted and transferred.

Figure 11:
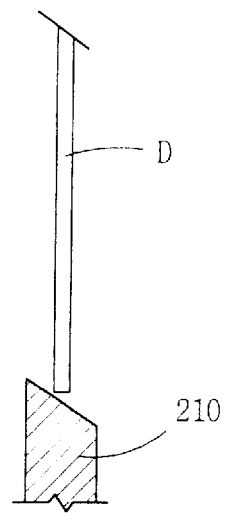
FIG. 11 is a detail view illustrating a guide unit for inducing the optical disc when entering into the main body of the disc reproducing device to be correctly centered in a state where the loading tray in accordance with the present invention is vertically oriented.

Also, when the optical disc D is vertically oriented and used, in order to exactly insert the optical disc D into the tray T and to induce the correct centering operation, referring to FIG. 11, a guide unit 210 is formed in a main body 200 of the device.

Figure 8:
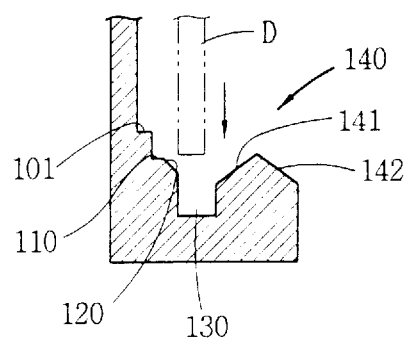
FIG. 8 is a cross-sectional view taken along line VIII—VIII in FIG. 7.

In the loading tray for an optical disc reproducing device according to the present invention, when the disc reproducing device is horizontally oriented, as illustrated in FIGS. 7 and 8, if a user positions the optical disc D on the tray T, the optical disc D is guided by the second sloped side 142 formed on the separation preventing tabs 140, correctly centered by the sloped guide surface 120 at the same time, and thus horizontally inserted onto the non-recording side supporting surface 101 indicated by a solid line in FIG. 7.

Thereafter, the optical disc D is transferred into the main body 200 of the optical disc reproducing device by movement of the tray T, clamped by a damper (not shown) on a turntable (not shown), rotated by a motor (not shown), and reproduced by an optical head (not shown).

Figure 12:
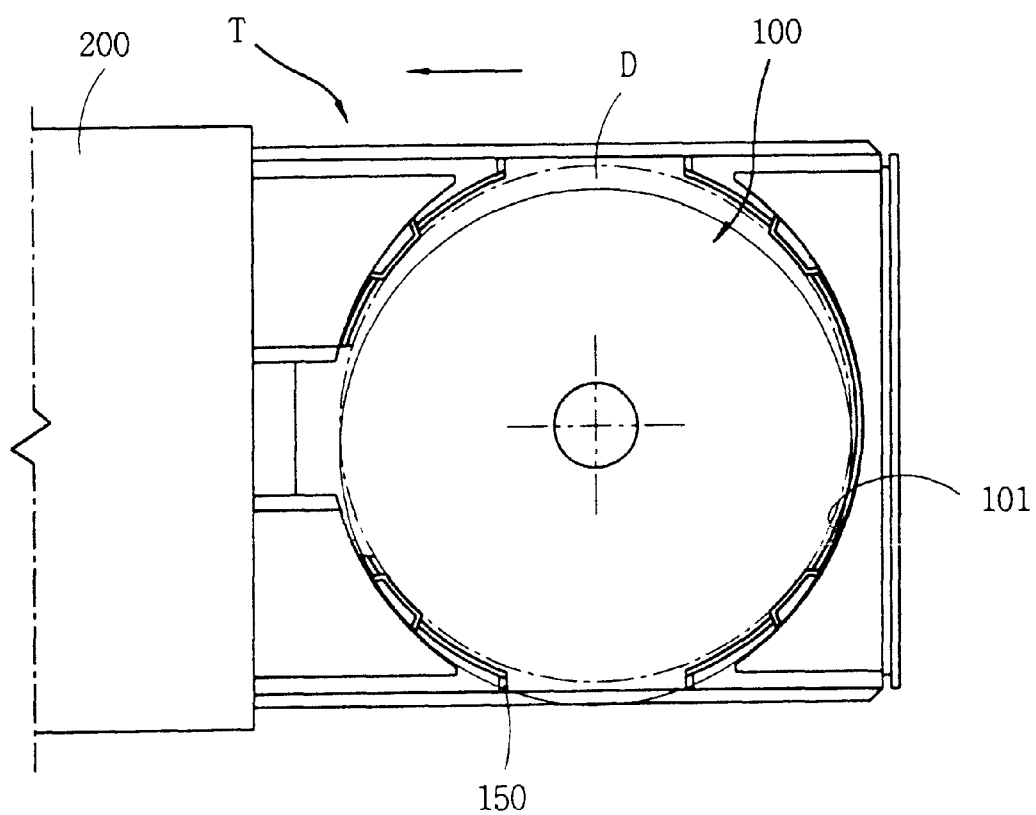
FIG. 12 is a view illustrating a state where the loading tray for transferring the optical disc in accordance with the present invention is vertically oriented.

On the other hand, referring to FIG. 12, when the user positions the optical disc D on the tray T in a state where the disc reproducing device is vertically oriented, the optical disc is lowered due to gravity from the position indicated by the double dashed broken line to the position indicated by the solid line, and thus is contacted with an outer portion of the vertical optical disc supporting groove 130 as shown in FIG. 8, and at the same time is supported by the separation preventing tabs 140 in order not to fall out.

Here, the optical disc separation preventing tabs 140 are formed eccentrically relative to the spindle axis, and thus prevent a surface of the optical disc D from being scratched when inserted or extracted.

In this state, when the user pushes a loading button, a tray moving device (not shown) is operated, and thus the tray T is moved in the direction indicated by the arrow in FIG. 12.

The optical disc D is coarsely vertically positioned, and transferred into the main body 200 of the optical disc reproducing device, together with the tray T.

Here, as the optical disc D is transferred from a position just before a final receiving position to the final receiving position, a protruded portion of the optical disc D, namely its lower portion is guided by the sloped guide surface 120.

That is, the optical disc D is guided and ascended by the sloped guide surface 120, and moved toward a center of the tray T, thereby performing a centering operation.

Thereafter, the optical disc D is clamped and reproduced.

As discussed earlier, in the loading tray for the optical disc reproducing device according to the present invention, an optical disc centering inducing device is provided on the tray, and thus performs the correct centering operation even when the user eccentrically positions the optical disc. Especially, when the disc reproducing device is vertically oriented, the optical disc is prevented from being separated from the tray.

In addition, the non-recording side supporting surface is formed in the tray, and thus the recording side of the optical disc is protected by the tray during the loading/unloading operation.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A loading tray for a tray-loading type optical disc reproducing device, comprising:

a tray base;

a side supporting surface formed in a stepped shape on an outer surface of the tray base;

a centering guide surface formed on an outer margin of the side supporting surface;

a sloped guide surface formed on an outer margin of the centering guide surface; and separation preventing tabs formed on the outer margin of the side supporting surface.

2. The loading tray for the optical disc reproducing device according to claim 1, wherein the optical disc separation preventing tabs each comprise:

a first sloped side facing to the sloped guide surface; and a second sloped side extended acutely from an end of the first sloped side, and sloped in an opposite direction thereto.

3. A loading tray for a tray-loading type optical disc reproducing device, comprising:

a tray base;

a side supporting unit formed at an outer margin of the tray base in a step shape for preventing a recording side of the disc from contacting the tray base;

a vertical optical disc supporting unit formed in an outer margin of the side supporting unit; and a slope guide surface formed between the side supporting unit and the vertical optical disc supporting unit and having a sloped surface for guiding the disc when the disc is moved from the side supporting unit to the vertical optical disc supporting unit so that a disc data surface is not damaged.

4. The loading tray for a tray-loading optical disc reproducing device according to claim 3, wherein a centering guide surface is formed on an outer margin of the side supporting unit.

5. The loading tray for a tray-loading optical reproducing device according to claim 3 wherein a receiving and extracting guide unit is formed at a portion of the loading tray positioned at one side of an outer surface of a firstly-inserted portion and a lastly-inserted portion of the tray base where the optical disc is inserted and transferred, in order to easily insert and extract the disc.

6. The loading tray for a tray-loading optical disc reproducing device according to claim 3, wherein a guide unit is formed at a portion of the loading tray positioned at both sides of an outer surface of an intermediately-inserted portion of the tray base where the optical disc is inserted and transferred, in order to support a non-recording side of the optical disc, and to guide movement of the optical disc when the optical disc is transferred into the reproducing device which is vertically operated.

7. The loading tray for a tray-loading optical disc reproducing device according to claim 3, wherein when the reproducing device is vertically operated, a guide unit is provided in a main body of the optical disc reproducing device in order to correctly insert the optical disc into the tray during an unclamping operation.

8. A loading tray for a tray-loading optical disc reproducing device, comprising:

a tray base;

a side supporting unit formed at an outer margin of the tray base in a step shape for preventing a recording side of the disc from contacting the tray base;

a vertical optical disc supporting groove formed in an outer margin of the side supporting unit, and a vertical optical disc guide unit having a sloped surface for guiding the disc when the disc is moved from the side supporting unit to the vertical optical disc supporting groove so that a disc data surface is not damaged; and optical disc separation preventing tabs for preventing the disc from being separated from said loading tray.

9. The loading tray for a tray-loading optical disc reproducing device according to claim 8, wherein the optical disc separation preventing tabs each comprises:

a first sloped side; and a second sloped side extended acutely from an end of the first sloped side, and sloped in an opposite direction thereto.

10. The loading tray for a tray-loading optical disc reproducing device according to claim 8, wherein when the optical disc is positioned centering around a spindle axis of the reproducing device, a minimum radius of the optical disc separation preventing tabs is greater than a maximum radius of the optical disc.

11. The loading tray for a tray-loading optical disc reproducing device according to claim 10, wherein when the optical disc is positioned centering around the spindle axis, the optical disc separation preventing tabs are eccentrically formed relative the spindle axis.

* * * * *